(12) United States Patent
Sakamoto et al.

(10) Patent No.: US 12,470,257 B2
(45) Date of Patent: Nov. 11, 2025

(54) DOPPLER SHIFT COMPENSATION APPARATUS AND DOPPLER SHIFT COMPENSATION METHOD

(71) Applicant: NTT, Inc., Tokyo (JP)

(72) Inventors: Kazumitsu Sakamoto, Musashino (JP);
Yosuke Fujino, Musashino (JP);
Daisuke Goto, Musashino (JP);
Yasuyoshi Kojima, Musashino (JP);
Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 266 days.

(21) Appl. No.: 18/039,073

(22) PCT Filed: Dec. 2, 2020

(86) PCT No.: PCT/JP2020/044904
§ 371 (c)(1),
(2) Date: May 26, 2023

(87) PCT Pub. No.: WO2022/118406
PCT Pub. Date: Jun. 9, 2022

(65) Prior Publication Data
US 2024/0214033 A1   Jun. 27, 2024

(51) Int. Cl.
*H04W 24/02* (2009.01)
*H04B 7/01* (2006.01)
*H04B 7/185* (2006.01)

(52) U.S. Cl.
CPC .......... *H04B 7/01* (2013.01); *H04B 7/18513* (2013.01)

(58) Field of Classification Search
CPC . H04W 68/02; H04W 52/0235; G01S 13/424; G01S 7/03; G01S 13/46; G01S 13/42; G01S 7/282; G01S 13/106; H04B 7/195
See application file for complete search history.

(56) References Cited

U.S. PATENT DOCUMENTS

2020/0351801 A1* 11/2020 Jeon ...................... H04W 52/48
2023/0013355 A1*  1/2023 Li ..................... H04W 52/0235

OTHER PUBLICATIONS

Itokawa et al., A Novel proposal for LEO satellite MIMO systems for 920MHz band Iot platform, IEICE Society Conference 2020, B-3-12, Sep. 2020.
Nakamura et al., Estimation of Channel and Frequency Offset in a MIMO-OFDM Space Division Multiplexing System, IEICE Transactions B, vol. J88-B, No. 9, pp. 1813-1820, Sep. 2005.

* cited by examiner

*Primary Examiner* — Phuoc H Doan
(74) *Attorney, Agent, or Firm* — Harness, Dickey & Pierce, P.L.C.

(57) ABSTRACT

A signal acquisition unit acquires a reception signal received by a reception device from a transmission device that moves relative to the reception device. A compensation unit compensates for a Doppler shift of the reception signal on the basis of a possibility of a change amount of the Doppler shift. A search unit changes a value of a possibility of the change amount of the Doppler shift in a case where a bandwidth having a power equal to or greater than a predetermined threshold in frequency components of the reception signal after the compensation is larger than a predetermined value.

5 Claims, 13 Drawing Sheets

DOPPLER SHIFT COMPENSATION APPARATUS AND DOPPLER SHIFT COMPENSATION METHOD

CROSS-REFERENCE TO RELATED APPLICATIONS

This application is a 371 National Stage of International Application No. PCT/JP2020/044904, filed on Dec. 2, 2020. The entire disclosures of the above applications are incorporated herein by reference.

TECHNICAL FIELD

The present invention relates to a Doppler shift compensation device (a Doppler shift compensation apparatus) and a Doppler shift compensation method.

BACKGROUND ART

In recent years, a satellite Internet of Things (IoT) platform (satellite IoT-PF) has been studied, the platform achieving sensor data collection from IoT terminals in any place on the earth including an area that is difficult to cover by a terrestrial communication network such as on the sea or in a mountain area by a low earth orbit (LEO) satellite (see, for example, Non Patent Literature 1). Since a low earth orbit satellite moves at a high speed, the Doppler shift amount greatly differs between the head and the tail of a received transmission frame.

In Non Patent Literature 2, as a Doppler shift compensation method, a method of adding a preamble and a postamble to a frame and obtaining a Doppler shift of each of the head and the tail of a frame from the preamble and the postamble has been studied.

CITATION LIST

Non Patent Literature

Non Patent Literature 1: Itokawa, Goto, Kojima, Yamashita, Yoshizawa, Sakamoto, Fujino, Kato, Nakadai, "Proposal of 920 MHz Band Satellite IoT Platform Utilizing Low Earth Orbit Satellite MIMO Technology", 2020 the Institute of Electronics, Information and Communication Engineers Communication Society Convention, B-13-12, September 2020

Non Patent Literature 2: Nakamura, Ogawa, Nishimura, Ogane, "Estimation of Channel and Frequency Offset in MIMO-OFDM Spatial Division Multiplexing System", The Institute of Electronics, Information and Communication Engineers Journal B Vol. J88-B, No. 9, pp. 1813-1820, September 2005

SUMMARY OF INVENTION

Technical Problem

As in the method disclosed in Non Patent Literature 2, when a known signal sequence such as a preamble and a postamble is added to a frame, a ratio of a payload in the frame decreases, which leads to a decrease in transmission efficiency. An object of the present invention is to provide a Doppler shift compensation device and a Doppler shift compensation method capable of compensating for a Doppler shift included in a reception signal regardless of the presence or absence of a known signal sequence.

Solution to Problem

An aspect of the present invention is a Doppler shift compensation device including: a signal acquisition unit that acquires a reception signal received by a reception device from a transmission device that moves relative to the reception device; a compensation unit that compensates for a Doppler shift of the reception signal on the basis of a possibility of a change amount of the Doppler shift; and a search unit that changes a value of the possibility of the change amount of the Doppler shift in a case where a bandwidth having power equal to or greater than a predetermined threshold in frequency components of the reception signal after compensation is larger than a predetermined value.

An aspect of the present invention is a Doppler shift compensation method including the steps of: acquiring a reception signal received by a reception device from a transmission device that moves relative to the reception device; compensating for a Doppler shift of the reception signal on the basis of a possibility of a change amount of the Doppler shift; and changing a value of the possibility of the change amount of the Doppler shift in a case where a bandwidth having power equal to or greater than a predetermined threshold in frequency components of the reception signal after compensation is larger than a predetermined value.

Advantageous Effects of Invention

According to the above aspect, it is possible to compensate for a Doppler shift included in a reception signal, regardless of the presence or absence of a known signal sequence.

DESCRIPTION OF EMBODIMENTS

Embodiments of the present invention are now described in detail with reference to the drawings.

First Embodiment

Figure 1:
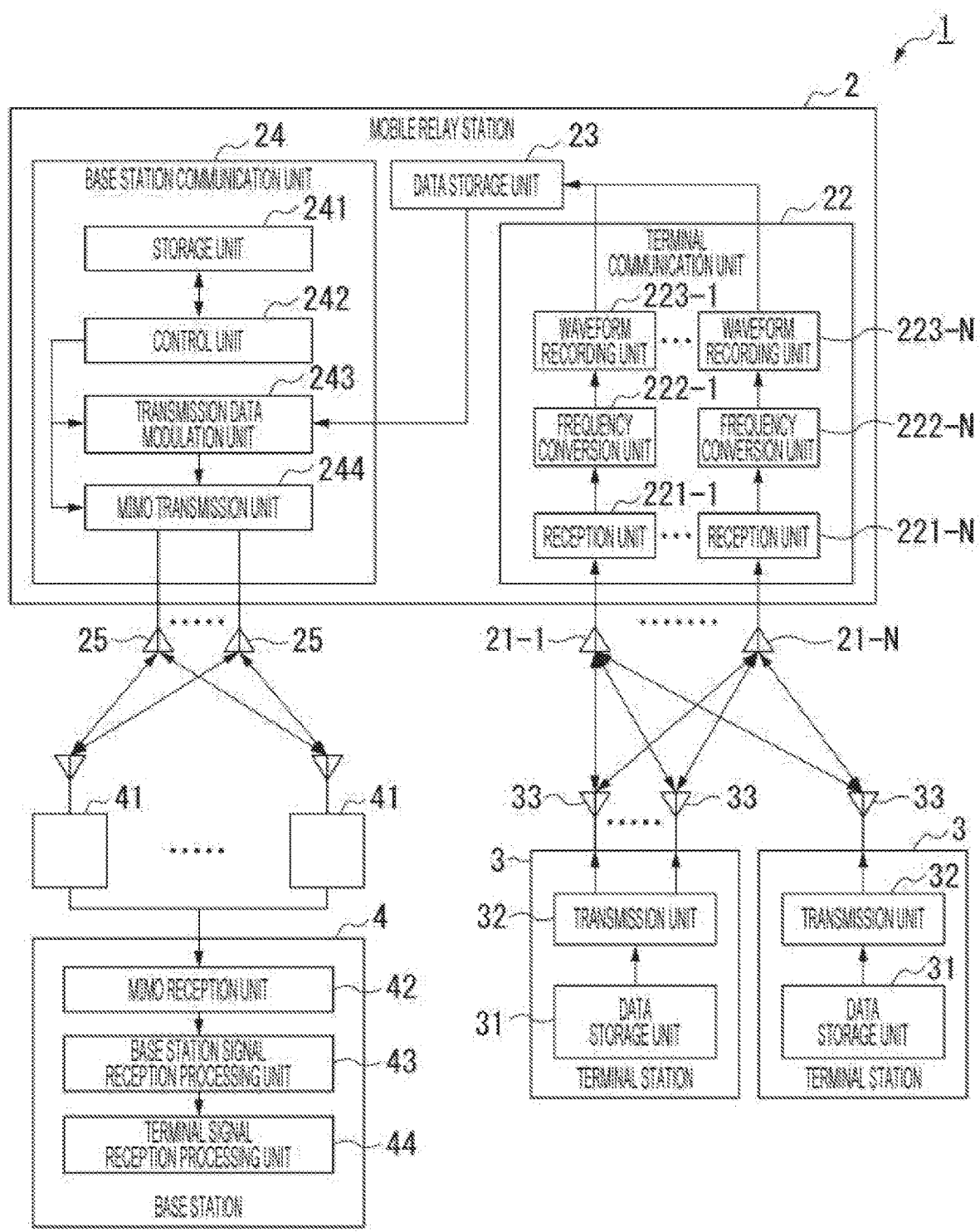
FIG. 1 is a diagram illustrating a configuration example of a wireless communication system according to a first embodiment.

FIG. 1 is a diagram illustrating a configuration example of a wireless communication system 1 according to a first embodiment. The wireless communication system 1 includes a mobile relay station 2, a terminal station 3, and a base station 4. Although the number of each of the mobile relay stations 2, the terminal stations 3, and the base stations 4 included in the wireless communication system 1 is arbitrary, it is assumed that the number of the terminal stations 3 is large.

The mobile relay station 2 is mounted on a mobile body. The mobile relay station 2 is an example of a relay device in which a communicable area moves as time passes. The mobile relay station 2 is provided in, for example, a low earth orbit (LEO) satellite. The altitude of the LEO satellite is equal to or less than 2000 km, and the LEO satellite orbits the earth in about 1.5 hours per lap. The terminal station 3 and the base station 4 are installed on the earth such as on the ground or on the sea. The terminal station 3 is, for example, an IoT terminal. The terminal station 3 collects data on environmental information (for example, the temperature) or the like detected by a sensor, and wirelessly transmits the collected data to the mobile relay station 2. In the drawing, there are two terminal stations 3 as an example. The mobile relay station 2 receives data transmitted from each of the plurality of terminal stations 3 by a wireless signal while moving over the earth, and wirelessly transmits the received data to the base station 4. The base station 4 receives data collected by the terminal station 3 from the mobile relay station 2.

As the mobile relay station, it is conceivable to use a relay station (relay device) mounted on an unmanned aerial vehicle such as a geostationary satellite, a drone, or a high altitude platform station (HAPS). However, in the case of a relay station mounted on a geostationary satellite, although a coverage area (footprint) on the ground is large, the link budget for an IoT terminal installed on the ground is very small due to the high altitude. On the other hand, in the case of a relay station mounted on a drone or a HAPS, although the link budget is high, the coverage area is small. Moreover, the drone requires a battery and the HAPS requires a solar panel. In the present embodiment, the mobile relay station 2 is mounted on an LEO satellite. Therefore, the link budget falls within a predetermined limit. Since the LEO satellite orbits outside the atmosphere, the air resistance of the LEO satellite is small, and the fuel consumption of the LEO satellite is also small. Moreover, the footprint of the LEO satellite is larger than that in a case where a relay station is mounted on a drone or a HAPS.

However, since the mobile relay station 2 mounted on the LEO satellite performs communication while moving at a high speed, a Doppler shift occurs in the wireless signal. In addition, the link budget of the relay station (relay device) mounted on the LEO satellite is smaller than that in a case where the relay station is mounted on the drone or the HAPS. Therefore, the mobile relay station 2 receives a wireless signal from the terminal station 3 using a plurality of antennas, and transmits the wireless signal to the base station 4 using the plurality of antennas. Communication quality can be improved by a diversity effect and a beamforming effect of communication using a plurality of antennas. In the present embodiment, the mobile relay station 2 relays a wireless signal received from the terminal station 3 using a plurality of antennas to the base station 4 using multiple input multiple output (MIMO).

A configuration of each device will be described.

The mobile relay station 2 includes N antennas 21 (N is an integer of 2 or more), a terminal communication unit 22, a data storage unit 23, a base station communication unit 24, and a plurality of antennas 25. The N antennas 21 are denoted as antennas 21-1 to 21-N.

The terminal communication unit 22 includes N reception units 221, N frequency conversion units 222, and N waveform recording units 223. The N reception units 221 are denoted as reception units 221-1 to 221-N. The N frequency conversion units 222 are denoted as frequency conversion units 222-1 to 222-N. The N waveform recording units 223 are denoted as waveform recording units 223-1 to 223-N. The reception unit 221-$n$ ($n$ is an integer of equal to or larger than 1 and equal to or smaller than N) receives a terminal uplink signal through the antenna 21-$n$. The frequency conversion unit 222-$n$ performs frequency conversion on the signal received by the reception unit 221-$n$ to obtain a baseband signal. The waveform recording unit 223-$n$ generates waveform data by sampling the baseband signal obtained by the frequency conversion unit 222-$n$, and accumulates the waveform data in the data recording unit 23. The sampling rate by the waveform recording unit 223-$n$ is a frequency that is twice or more the bandwidth of the terminal uplink signal.

The base station communication unit 24 is a functional unit that relays a terminal uplink signal to the base station 4 by MIMO. The base station communication unit 24 includes a storage unit 241, a control unit 242, a transmission data modulation unit 243, and a MIMO transmission unit 244. The storage unit 241 stores a transmission start timing calculated in advance on the basis of the information on the trajectory of the LEO satellite on which the mobile relay station 2 is mounted and the position of the base station 4. In addition, the storage unit 241 stores in advance a weight for each transmission time of the base station downlink signal transmitted from each antenna 25. The transmission time may be expressed as, for example, an elapsed time from the transmission start timing. The weight for each transmission time is derived on the basis of the information on the trajectory of the LEO satellite and the position of each antenna station 41. The information on the trajectory of the LEO is information from which the position, velocity, movement direction, and the like of the LEO satellite at an arbitrary time can be obtained. The weight for each transmission time of the base station downlink signal may be constant regardless of the transmission time.

The control unit 242 controls the transmission data modulation unit 243 and the MIMO transmission unit 244 to transmit the reception waveform information to the base station 4 at the transmission start timing stored in the storage unit 241. Furthermore, the control unit 242 instructs the MIMO transmission unit 244 on the weight for each transmission time read from the storage unit 241. The transmission data modulation unit 243 reads the reception waveform information from the data storage unit 23 as transmission data. The transmission data modulation unit 243 converts the read transmission data into a parallel signal and modulates the parallel signal. The transmission data modulation unit 243 outputs the modulated parallel signal to the MIMO transmission unit 244. The MIMO transmission unit 244 generates the base station downlink signal transmitted from each antenna 25 by weighting the parallel signal using the weight instructed from the control unit 242. The MIMO transmission unit 244 transmits the generated base station downlink signal from the antenna 25 by MIMO.

The terminal station 3 includes a data storage unit 31, a transmission unit 32, and one or a plurality of antennas 33. The data storage unit 31 stores sensor data and the like. The transmission unit 32 reads the sensor data from the data storage unit 31 as terminal transmission data. The transmission unit 32 transmits a terminal uplink signal (wireless signal) including the read terminal transmission data from the antenna 33. The transmission unit 32 transmits a wireless signal using, for example, low power wide area (LPWA). Examples of the LPWA include wireless communication methods such as LoRaWAN (registered trademark), Sigfox (registered trademark), Long Term Evolution for Machines (LTE-M), Narrow Band (NB)-IoT, IEEE 802.15.4k, and ELTRES (registered trademark), but any wireless communication method can be used. In these communication methods, since the length of one frame is about several hundred milliseconds to two seconds, the difference between the Doppler shift amount of the head and the Doppler shift amount of the tail is about several hundred Hz, and the influence on the reception accuracy is large. In particular, for Sigfox (registered trademark), since one channel has a narrow band of 100 Hz width, the frequency is shifted by several channels at the head and the tail of the frame, and the influence on the reception accuracy is very large. The transmission unit 32 may perform communication with another terminal station 3 by time division multiplexing, orthogonal frequency division multiplexing (OFDM), MIMO, or the like. The transmission unit 32 determines a channel and a transmission timing to be used by its own station for transmission of a terminal uplink signal by a method determined in advance in a wireless communication system to be used. In addition, the transmission unit may form beams of wireless signals transmitted from the plurality of antennas 33 according to a method determined in advance in a wireless communication system to be used.

The base station 4 includes a plurality of antenna stations 41, a MIMO reception unit 42, a base station signal reception processing unit 43, and a terminal signal reception processing unit 44.

The antenna stations 41 are arranged at positions separated from the other antenna stations 41 so that the arrival angle differences of the wireless signals transmitted from the plurality of antennas 25 of the mobile relay station 2 become large. Each antenna station 41 converts the base station downlink signal received from the mobile relay station 2 into an electrical signal, and outputs the converted electrical signal to the MIMO reception unit 42.

The MIMO reception unit 42 aggregates the base station downlink signals received from the plurality of antenna stations 41. The MIMO reception unit 42 stores a weight for each reception time for the base station downlink signal received by each antenna station 41 on the basis of the information on the trajectory of the LEO satellite and the position of each antenna station 41. The reception time may be expressed as, for example, an elapsed time from the reception start timing. The MIMO reception unit 42 multiplies the base station downlink signal input from each antenna station 41 by a weight corresponding to the reception time of the base station downlink signal. The MIMO reception unit 42 synthesizes the reception signals multiplied by the weights. The same weight may be used regardless of the reception time. The base station signal reception processing unit 43 obtains a baseband signal by performing frequency conversion on the synthesized reception signal. Further, the base station signal reception processing unit 43 decodes the baseband signal to reproduce the waveform data corresponding to each antenna 21 of the mobile relay station 2.

The terminal signal reception processing unit 44 performs reception processing of the terminal uplink signal on the basis of the plurality of pieces of waveform data reproduced by the base station signal reception processing unit. The terminal signal reception processing unit 44 decodes the symbol of the signal indicated by the waveform data, and obtains terminal transmission data transmitted from the terminal station 3.

Figure 2:
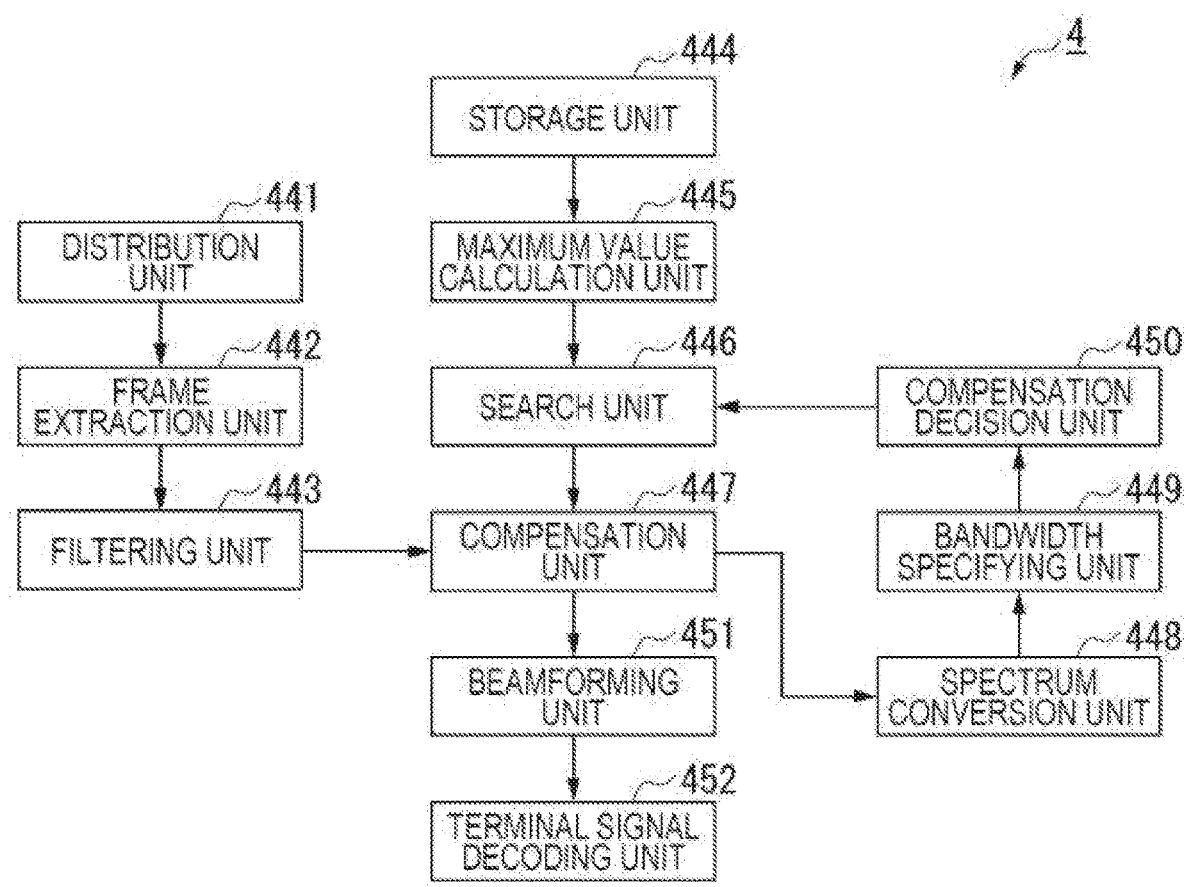
FIG. 2 is a schematic block diagram illustrating a configuration of a terminal signal reception processing unit according to the first embodiment.

FIG. 2 is a schematic block diagram illustrating a configuration of the terminal signal reception processing unit 44 according to the first embodiment.

The terminal signal reception processing unit 44 includes a distribution unit 441, a frame extraction unit 442, a filtering unit 443, a storage unit 444, a maximum value calculation unit 445, a search unit 446, a compensation unit 447, a spectrum conversion unit 448, a bandwidth specifying unit 449, a compensation decision unit 450, a beamforming unit 451, and a terminal signal decoding unit 452.

The distribution unit 441 distributes the waveform data acquired from the base station signal reception processing unit 43 to waveform data for each antenna 21 of the mobile relay station 2. The distribution unit 441 is an example of a signal acquisition unit that acquires a reception signal received by the reception device from the transmission device. Each waveform data represents a waveform of a reception signal in the mobile relay station. The frame extraction unit 442 extracts a frame of a terminal uplink signal by the terminal station 3 from each waveform data acquired by the signal acquisition unit. For example, the frame extraction unit 442 extracts a section in which the signal level in the time domain exceeds the threshold in the waveform data as a frame. The threshold used for extracting the frame is set to a value obtained by adding a margin to the level in the time domain of a noise portion generated in the reception unit 221 of the mobile relay station 2 measured in advance. Hereinafter, the frame extracted by the frame extraction unit 442, that is, the frame having the waveform received by the mobile relay station 2 will be referred to as a reception frame.

The filtering unit 443 performs filtering on each reception frame so as to extract a frequency band related to the reception frame. For example, since the change width of the Doppler shift can be calculated in advance on the basis of the altitude and the moving velocity of the LEO satellite indicated by the information on the trajectory of the LEO satellite, the filtering unit 443 filters the reception frame by a band pass filter related to a frequency band in which a margin is provided in the change width of the Doppler shift.

The storage unit 444 stores position data of the base station 4 and trajectory data of the LEO satellite. The position data of the base station 4 is represented by, for example, latitude and longitude. The trajectory data of the LEO satellite is data from which the position, velocity, movement direction, and the like of the LEO satellite at an arbitrary time can be obtained. The distance when the base station 4 and the LEO satellite are closest to each other can be obtained on the basis of the position data of the base station 4 and the trajectory data of the LEO satellite. In a case where the reception beam of the mobile relay station 2 is substantially orthogonal to the ground surface, the altitude of the LEO satellite may be regarded as the distance when the base station 4 and the LEO satellite are closest to each other.

The maximum value calculation unit 445 obtains the altitude of the LEO satellite with respect to the ground on the basis of the trajectory data of the LEO satellite, and calculates the maximum value of the change amount of the Doppler shift generated in the reception signal based on the altitude. The magnitude f(x) of the Doppler shift can be obtained by the following Equation (1) as a function of the position x of the LEO satellite.

[Equation 1]

$$f(x) = \left(1 - \frac{c + v\frac{x}{\sqrt{d^2 + x^2}}}{c}\right) F \quad (1)$$

In Equation (1), c represents the speed of light. In Equation (1), v is the velocity of the LEO satellite in the azimuth direction. In Equation (1), d is a distance when the LEO satellite and the base station 4 are closest to each other. In Equation (1), x is the position of the LEO satellite on the coordinate axis along the trajectory of the LEO satellite. The coordinate axis has an origin at a position where the LEO satellite and the base station 4 are closest to each other. F is a frequency of a transmission signal from the mobile relay station 2.

The maximum value calculation unit 445 obtains the maximum value of the change amount of the Doppler shift by obtaining the differential value of f(0) on the basis of the above Equation (1).

The search unit 446 determines a search range of the change amount of the Doppler shift on the basis of the maximum value of the change amount of the Doppler shift calculated by the maximum value calculation unit 44. The search unit 446 searches the change amount of the Doppler shift by the ternary search for the determined search range. Specifically, the search unit 446 searches for the change amount of the Doppler shift by the following procedure.

The search unit 446 determines a 33 percentile value of the search range and a 66 percentile value of the search range as possibilities for the change amount of the Doppler shift. Hereinafter, a possibility of the 33 percentile of the search range is referred to as a lower possibility, and a possibility of the 66 percentile of the search range is referred to as an upper possibility. In a case where at least one of the compensation result of the reception signal by the lower possibility and the compensation result of the reception signal by the upper possibility is equal to or smaller than the allowable value of the Doppler shift, the search unit 446 ends the search. The allowable value of the Doppler shift is set to a value that can be decoded in a wireless system of a signal including a Doppler change equal to or smaller than the allowable value. On the other hand, in a case where both of the compensation result of the reception signal by the lower possibility and the compensation result of the reception signal by the upper possibility exceed the allowable value of the Doppler shift, the search unit 446 specifies a smaller one of the compensation result of the reception signal by the lower possibility and the compensation result of the reception signal by the upper possibility. The search unit 446 narrows the search range by changing the end of the search range having the larger Doppler shift to the value of the larger Doppler shift between the upper possibility and the lower possibility. By repeating this processing, the search unit 446 searches for the change amount of the Doppler shift. The search unit 446 is an example of a change unit that changes the value of the possibility of the change amount of the Doppler shift in a case where the bandwidth of the reception signal after the compensation is larger than a predetermined value.

The compensation unit 447 compensates for the Doppler shift change of the reception frame on the basis of each of the upper possibility and the lower possibility determined by the search unit 45. Specifically, the compensation unit 447 compensates for the Doppler shift change by dividing the reception frame for each unit time and frequency-shifting each divided partial frame by the Doppler shift amount corresponding to the reception time. At this time, the compensation unit 447 obtains the Doppler shift amount according to the reception time by multiplying the elapsed time from the time of the head of the frame by the change amount of the Doppler shift. Hereinafter, the reception frame in which the Doppler shift change is compensated by the compensation unit 447 is referred to as a compensated frame.

The spectrum conversion unit 448 converts the filtered reception frame into a frequency spectrum. The spectrum conversion unit. 448 obtains a frequency spectrum of the reception frame by, for example, fast Fourier transform (FFT).

Figure 3A:
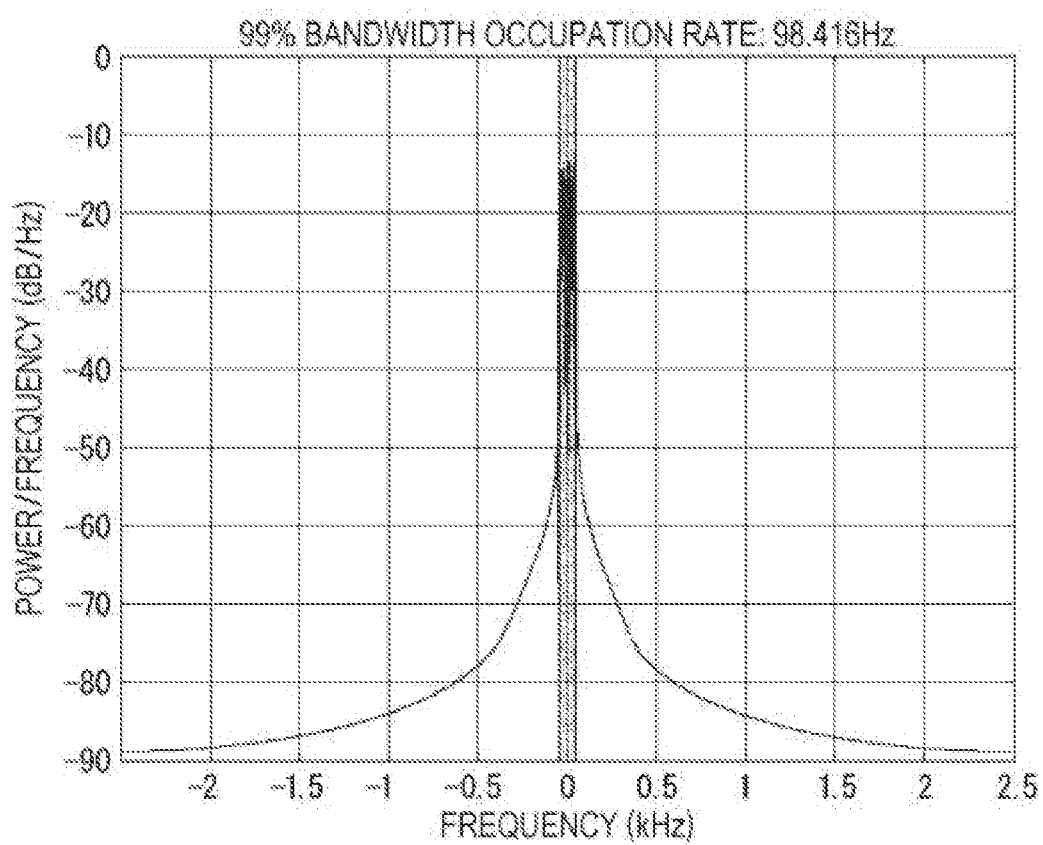
FIG. 3A is a diagram illustrating an example of estimation values of a waveform and a bandwidth of a transmission signal.
Figure 3B:
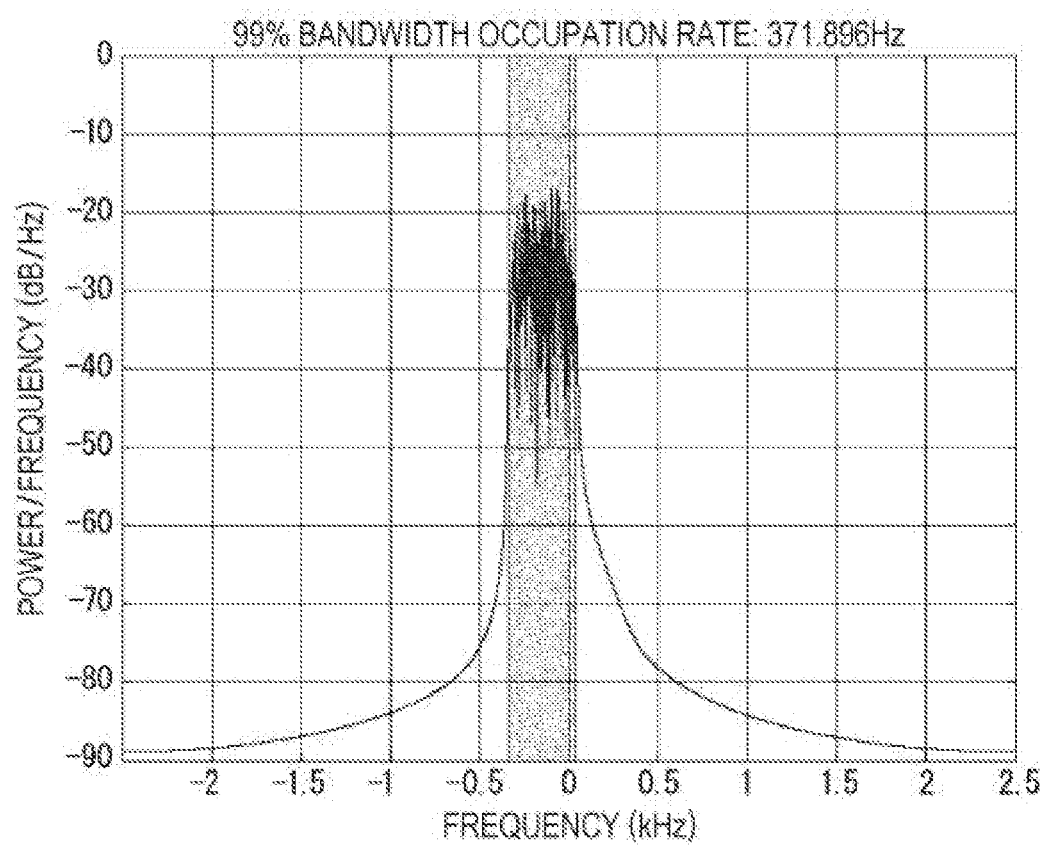
FIG. 3B is a diagram illustrating an example of estimation values of a waveform and a bandwidth of a reception signal.

The bandwidth specifying unit 449 specifies the bandwidth of the signal on the basis of the frequency spectrum obtained by the spectrum conversion unit 448. For example, the bandwidth specifying unit 449 specifies, as the bandwidth of the signal, a bandwidth that occupies a predetermined ratio (for example, 99%) of the total power of the FFT section in the frequency spectrum obtained by the spectrum conversion unit 448. FIGS. 3A and 3B are diagrams illustrating an example of specifying a bandwidth on the basis of a ratio of the total power, and illustrate an estimation example of 99% bandwidth of a baseband signal. FIG. 3A is a diagram illustrating an example of estimation values of a waveform and a bandwidth of a transmission signal. FIG. 3B is a diagram illustrating an example of estimation values of a waveform and a bandwidth of a reception signal. In FIGS. 3A and 3B, the horizontal axis represents frequency, and the vertical axis represents power density. Here, the transmission signal bandwidth is set to 100 Hz, and the Doppler shift is linearly set to 0-300 Hz in the frame in the frequency decreasing direction. According to FIG. 3A, the 99% bandwidth estimation value of the transmission signal indicates 98.416 Hz. According to FIG. 3B, the 99% bandwidth estimation value of the reception signal is 371.896 Hz.

Figure 4A:
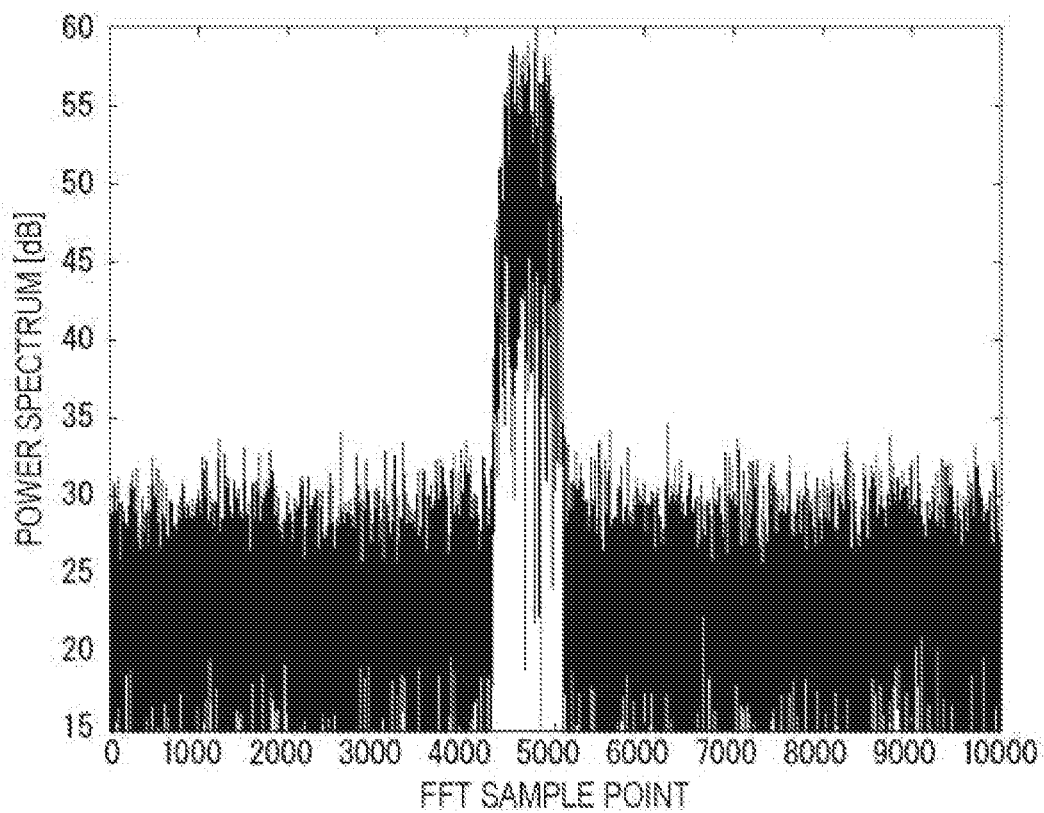
FIG. 4A is a diagram illustrating a power spectrum of a reception signal.
Figure 4B:
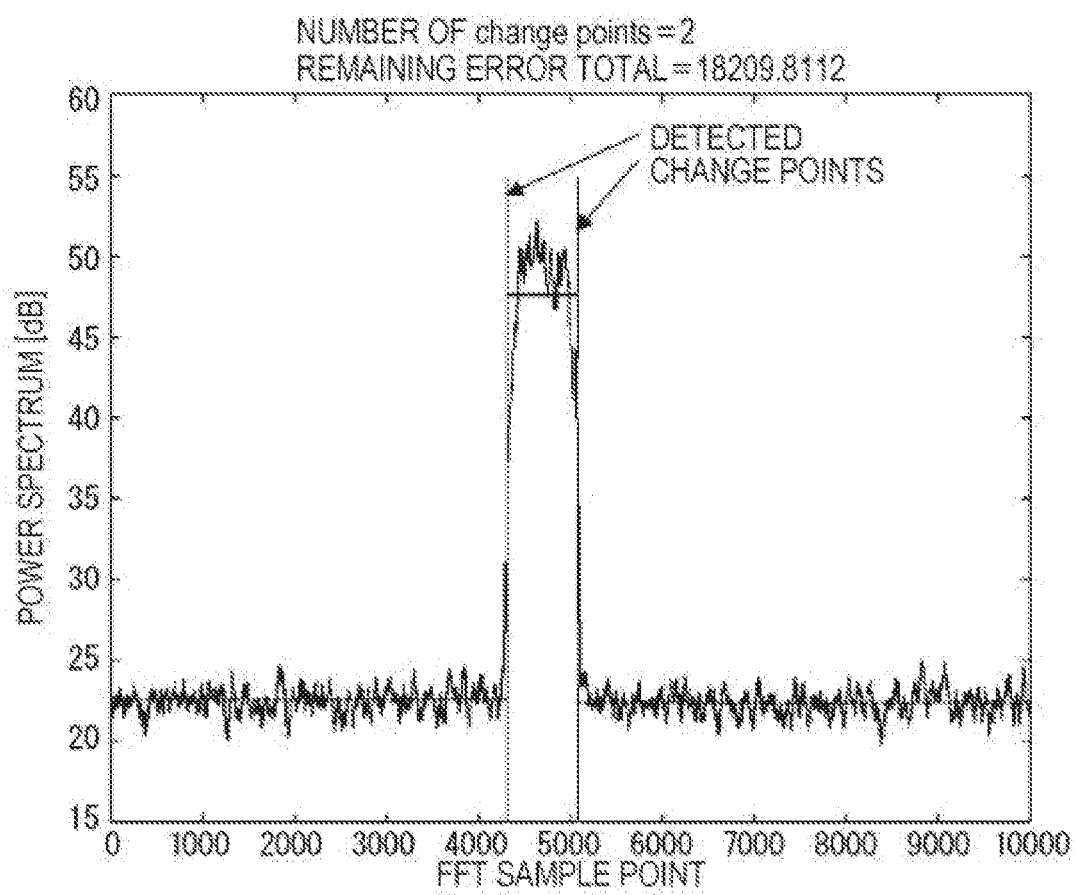
FIG. 4B is a diagram illustrating a result of obtaining a moving average of reception signals using a bandpass filter having a bandwidth of 100 Hz.

For example, the bandwidth specifying unit 449 calculates a moving average value of power of the frequency spectrum while sliding a band pass filter narrower than the FFT section in the frequency domain, calculates two power change points (point at which power exceeds threshold in moving average waveform, inflection point of moving average waveform, and the like), and specifies the difference as the bandwidth of the signal. FIGS. 4A and 4B are diagrams illustrating an example in which a bandwidth is specified on the basis of a power change point of a moving-averaged frequency spectrum. FIG. 4A is a diagram illustrating a power spectrum of a reception signal. The horizontal axis represents the FFT sample point, and the vertical axis represents the power spectrum. The conditions of the bandwidth and the Doppler shift of the transmission signal are the same as those in FIG. 3B. FIG. 4B is a diagram illustrating a result of obtaining a moving average of reception signals using a bandpass filter having a bandwidth of 100 Hz. As illustrated in FIG. 4B, it can be seen that the rapid fluctuation of the power spectrum due to the noise component can be reduced by taking the moving average. In the example illustrated in FIG. 4B, the number of change points to be detected is two. Here, a point at which the change in the average value in the horizontal axis direction is maximum is extracted as a change point. As illustrated in FIG. 4B, the band between the two change points obtained from the reception signal illustrated in FIG. 4A is 386.5 Hz. As illustrated in FIG. 4B, since the bandwidth specifying unit 449 can moderate the change in the noise component by taking the moving average, it is possible to further clarify the boundary between the signal band and the noise band.

Figure 5A:
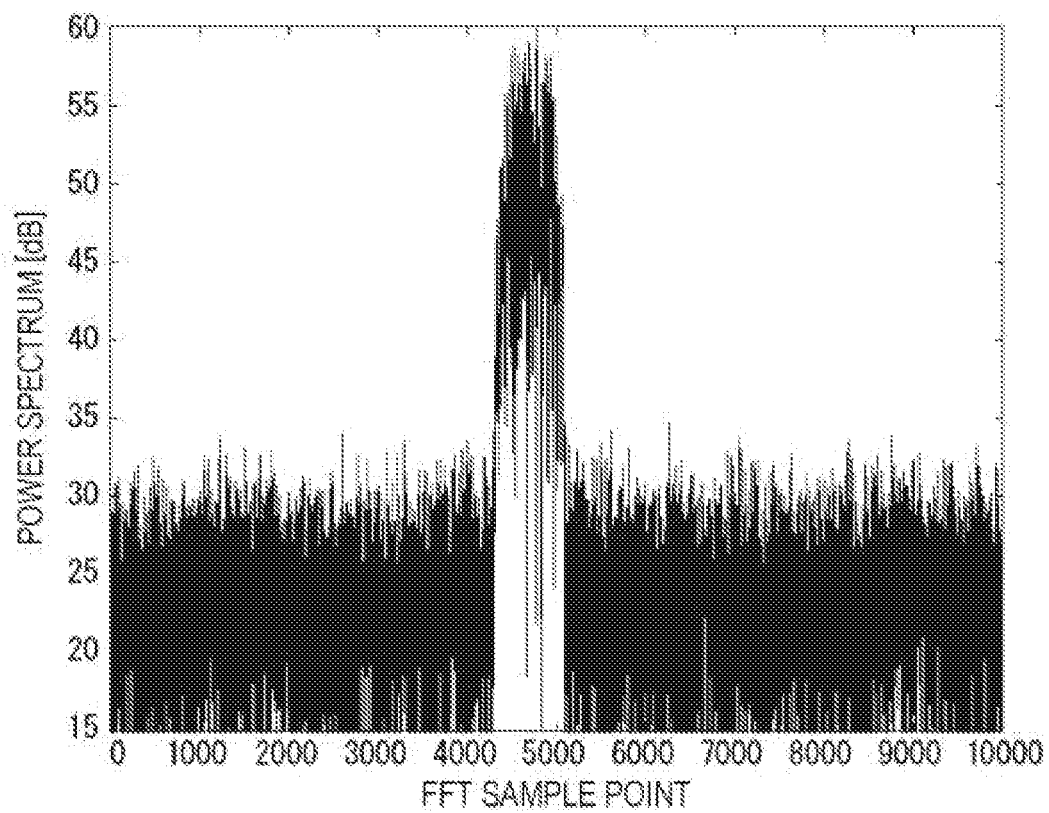
FIG. 5A is a diagram illustrating a power spectrum of a reception signal.
Figure 5B:
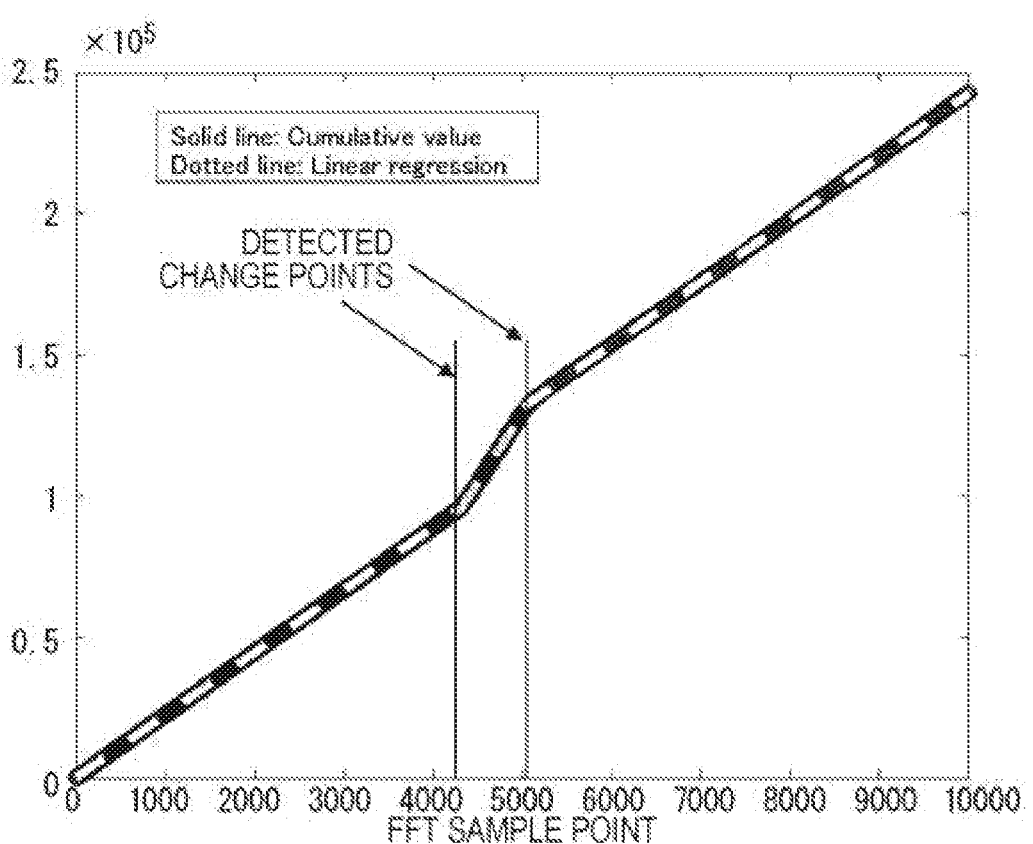
FIG. 5B is a diagram illustrating a cumulative value of a reception signal from a lower end of an FFT sample point.

For example, the bandwidth specifying unit 449 calculates a cumulative value of the spectral power in the FFT section, obtains a slope of the cumulative value by a method such as linear regression, and then sets a band between two points at which the slope changes in the accumulated frequency graph representing the cumulative value as the signal bandwidth. FIGS. 5A and 5B are diagrams illustrating an example in which a bandwidth is specified on the basis of a change point of a cumulative value of a frequency spectrum. FIG. 5A is a diagram illustrating a power spectrum of a reception signal. In FIG. 5A, the horizontal axis represents the FFT sample point, and the vertical axis represents the power spectrum. FIG. 5B is a diagram illustrating a cumulative value of a reception signal from a lower end of an FFT sample point. When a variable x is an FFT sample point and y(x) is a power spectrum at x, a cumulative value at x=x' is given by the following Equation (2).

[Equation 2]

$$s(x') = \sum_{x=0}^{x'} y(x) \quad (2)$$

In FIG. 5B, a solid line indicates a cumulative value, and a broken line indicates a linear regression result. For the detection of the change point of the slope, for example, a method of obtaining a section in which a result of linear regression and a root mean square error of each sample are minimized is used. In this method, as illustrated in FIG. 5B, since the bandwidth is estimated on the basis of a change in power, it is possible to distinguish between noise power and signal power.

The compensation decision unit 450 determines whether a value obtained by dividing the bandwidth of the compensated frame generated by the compensation unit 447 by the frame length is equal to or smaller than a predetermined allowable value.

The beamforming unit 451 synthesizes the compensated frames received at the same time by each antenna 21 using a gain and a phase shift corresponding to the relative position between the terminal station 3 and the mobile relay station 2 at the time such that the reception beam of the mobile relay station 2 is directed to the terminal station 3. Hereinafter, the compensated frame synthesized by the beamforming unit 451 is referred to as a composite frame. In another embodiment, the terminal signal reception processing unit 44 may include a composition unit that performs additive synthesis on the received frames instead of the beamforming unit 451. In this case, since the signal transmitted by the terminal station 3 has a correlation, the signal is emphasized by additive synthesis. Furthermore, the influence of noise randomly added to the signal is reduced by additive synthesis. Therefore, the diversity effect can be obtained for the terminal uplink signal that the mobile relay station 2 simultaneously receives from only one terminal station 3. The additive synthesis of the terminal uplink signals simultaneously received by the mobile relay station 2 from the plurality of terminal stations 3 corresponds to performing MIMO communication.

The terminal signal decoding unit 452 decodes the symbol of the terminal uplink signal by decoding the composite frame, and obtains data transmitted from the terminal station 3. The terminal signal decoding unit 452 can also use a decoding method with a large calculation load, such as SIC.

Next, an operation of the wireless communication system 1 will be described.

Figure 6:
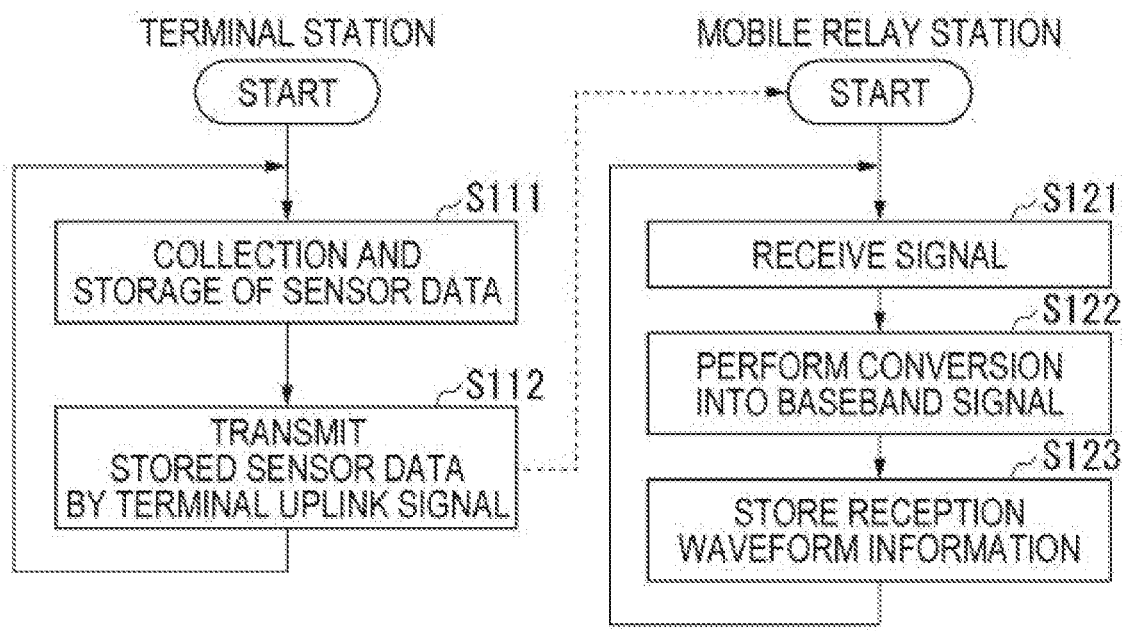
FIG. 6 is a flowchart illustrating processing of the wireless communication system.

FIG. 6 is a flowchart illustrating processing of the wireless communication system 1. The terminal station 3 acquires data detected by a sensor (not illustrated) provided in the terminal station 3 at any time, and writes the acquired data in the data storage unit 31 (step S111). The transmission unit 32 reads the sensor data from the data storage unit 31 as terminal transmission data. The transmission unit 32 wirelessly transmits a terminal uplink signal including terminal transmission data from the antenna 33 at a transmission start timing derived in advance on the basis of the information on the trajectory of the LEO satellite mounted on the mobile relay station 2 (step S112). The terminal station 3 repeats the processing from step S111.

The reception units 221-1 to 221-N of the mobile relay station 2 receive the terminal uplink signal transmitted from the terminal station 3 (step 3121). Since the mobile relay station 2 does not know the transmission timing of the terminal uplink signal, the mobile relay station 2 continuously receives the signal in step S121 from arrival at the sky above the reception target area to passing therethrough. Depending on the wireless communication scheme of the transmission source terminal station 3, there are a case where the terminal uplink signal is received from only one terminal station 3 in a time division manner at the same frequency and a case where the terminal uplink signals are simultaneously received from a plurality of terminal stations 3 at the same frequency. The frequency conversion unit 222-n converts the signal received by the corresponding reception unit 221-n into a baseband signal by frequency conversion (step S122). The waveform recording unit 223-n generates waveform data by sampling the baseband signal obtained by the corresponding frequency conversion unit 222-n. The waveform recording unit 223-n writes reception waveform information in which waveform data, a reception time, and an antenna identifier of the antenna 21-n are associated with each other in the data storage unit 23 (step 3:23). The mobile relay station 2 repeats the processing from step S121.

Figure 7:
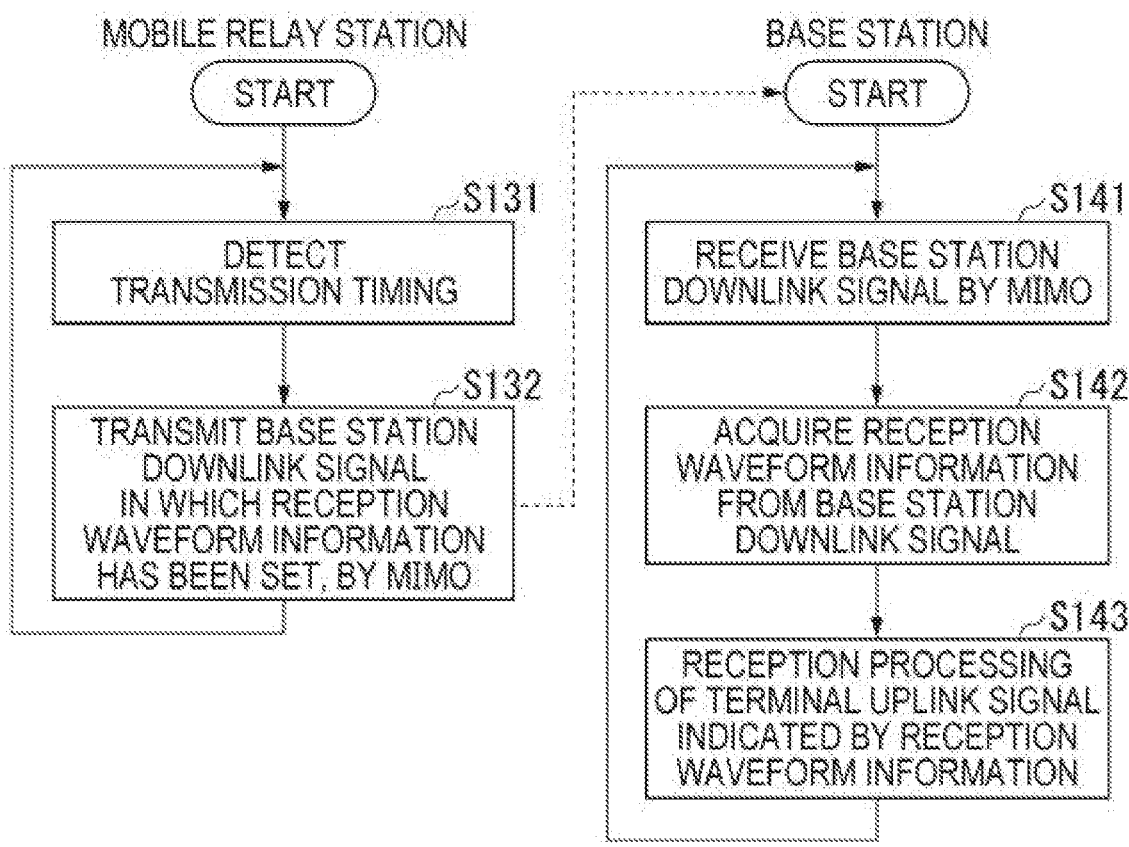
FIG. 7 is a flowchart illustrating processing of the wireless communication system in a case where a downlink signal is transmitted from the mobile relay station to a terminal station.

FIG. 7 is a flowchart illustrating processing of the wireless communication system 1 in a case where a downlink signal is transmitted from the mobile relay station 2 to a terminal station. When detecting that it is the transmission start timing stored in the storage unit 241, the control unit 242 included in the base station communication unit 24 of the mobile relay station 2 instructs the transmission data modulation unit 243 and the MIMO transmission unit 244 to transmit the received waveform information (step S131). The transmission data modulation unit 243 reads the reception waveform information accumulated in the data storage unit 23 as transmission data. The transmission data modulation unit 243 converts the read transmission data into a parallel signal and modulates the parallel signal. The MIMO transmission unit 244 performs weighting on the transmission data modulated by the transmission data modulation unit 243 using the weight instructed from the control unit 242. As a result, the MIMO transmission unit 244 generates a base station downlink signal transmitted from each antenna 25. The MIMO transmission unit 244 transmits the generated base station downlink signal from the antenna 25 by MIMO (step S132). The mobile relay station 2 repeats the processing from step S131.

The base station 4 receives the base station downlink signal from the mobile relay station 2 by MIMO (step S141). Specifically, each antenna station 41 converts the base station downlink signal received from the mobile relay station 2 into an electrical signal, and outputs the converted electrical signal to the MIMO reception unit 42 as a reception signal. The MIMO reception unit 42 synchronizes the timings of the reception signals received from antenna stations 41. The MIMO reception unit 42 multiplies the reception signal received by each antenna station 41 by a weight and adds the reception signal multiplied by the weight. The base station signal reception processing unit 43 demodulates the added reception signal (step S142). The base station signal reception processing unit 43 outputs reception waveform information obtained by decoding the demodulated reception signal to the terminal signal reception processing unit 44. The terminal signal reception processing unit 44 performs reception processing of the terminal uplink signal indicated by the reception waveform information (step S143). The base station 4 repeats the processing from step S141.

Figure 8:
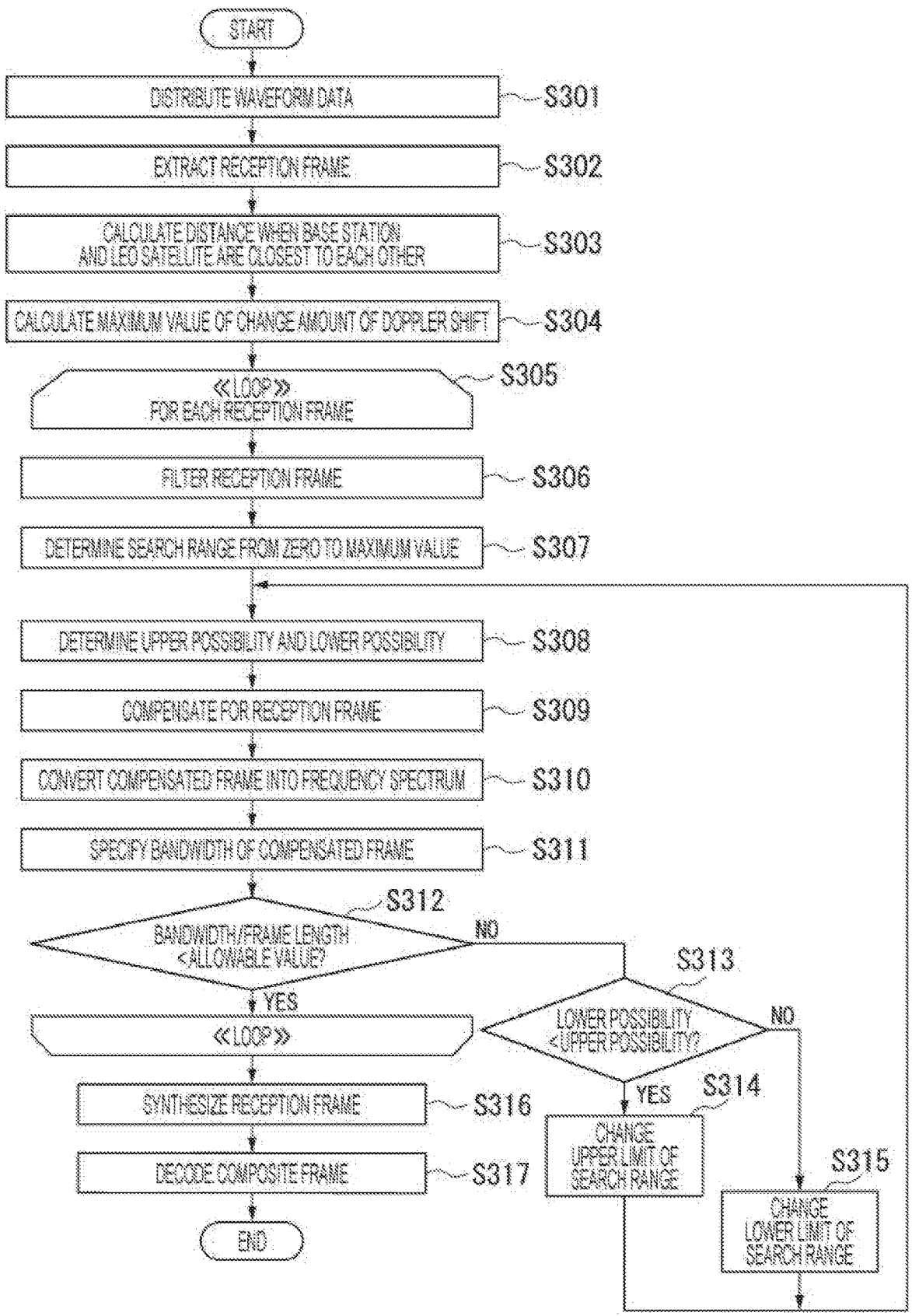
FIG. 8 is a flowchart illustrating an operation of a terminal signal reception processing unit in the first embodiment.

FIG. 8 is a flowchart illustrating an operation of the terminal signal reception processing unit 44 in the first embodiment. The distribution unit 441 of the terminal signal reception processing unit 44 distributes the waveform data acquired from the base station signal reception processing unit 43 to waveform data for each antenna 21 of the mobile relay station 2 (step S301). The frame extraction unit 442 extracts the reception frame from each waveform data acquired in step S301 (step S302). The maximum value calculation unit 445 obtains the distance when the base station 4 and the LEO satellite are closest to each other on the basis of the position data of the base station 4 and the trajectory data of the LEO satellite stored in the storage unit. 444 (step 3303). The maximum value calculation unit 445 calculates the maximum value of the change amount of the Doppler shift occurring in the reception signal on the basis of the calculated distance (step S304). Hereinafter, the base station 4 selects the reception frames extracted in step S302 one by one (step 3305), and performs the following processing in steps S306 to S315 for the selected reception frames.

The filtering unit 443 filters the reception frame selected in step 3303 in a frequency band based on the change width of the Doppler shift (step S306). The search unit 446 determines the search range of the change amount of the Doppler shift from zero to the maximum value calculated in step S4 (step 3307).

The search unit 446 determines a 33 percentile value of the search range as a lower possibility, and determines a 66 percentile value of the search range as an upper possibility (step S308). The compensation unit 447 compensates for the Doppler shift of the reception frame selected in step 3305 on the basis of each of the upper possibility and the lower possibility determined in step S308 (step S3309).

The spectrum conversion unit 448 converts each compensated frame in step S309 into a frequency spectrum (step S310). The bandwidth specifying unit 449 specifies the bandwidth of each compensated frame on the basis of each frequency spectrum obtained in step S310 (step S311). The compensation decision unit 450 determines whether at least one of values obtained by dividing each bandwidth specified in step S311 by the frame length is equal to or smaller than an allowable value (step S312). That is, the compensation decision unit 450 determines whether at least one of the change amount of the Doppler shift remaining in the compensated frame by the lower possibility and the change amount of the Doppler shift remaining in the compensated frame by the upper possibility is equal to or smaller than the allowable value.

When both the change amount of the Doppler shift remaining in the compensated frame by the lower possibility and the change amount of the Doppler shift remaining in the compensated frame by the upper possibility exceed the allowable value (step S312: NO), the search unit 446 decides whether the bandwidth of the compensated frame by the lower possibility is smaller than the bandwidth of the compensated frame by the upper possibility (step S313). When the bandwidth of the compensated frame by the lower possibility is smaller than the bandwidth of the compensated frame by the upper possibility (step S313: YES), the search unit 446 changes the upper limit of the search range to the value of the upper possibility (step S314). On the other hand, when the bandwidth of the compensated frame by the lower possibility is equal or larger than the bandwidth of the compensated frame by the upper possibility (step S313: NO), the search unit 446 changes the lower limit of the search range to the value of the lower possibility (step S315). Then, the process returns to step 3308 and the base station 4 continues the search for the change amount of the Doppler shift.

In a case where at least one of the change amount of the Doppler shift remaining in the compensated frame by the lower possibility and the change amount of the Doppler shift remaining in the compensated frame by the upper possibility is equal to or smaller than the allowable value (step 3312: YES), the compensation unit 447 outputs the compensated frame having the smaller change amount of the Doppler shift to the beamforming unit 451.

When the compensation unit 447 outputs the compensated frame for each reception frame, the beamforming unit 451 synthesizes the compensated frames received at the same time in each antenna 21 to obtain a composite frame for each reception time (step S316). The terminal signal decoding unit 452 decodes the symbol of the terminal uplink signal by decoding each composite frame, and obtains data transmitted from the terminal station 3 (step 3317).

As described above, the base station 4 according to the first embodiment repeatedly performs the compensation of the Doppler shift of the reception signal on the basis of the plurality of possibilities of the change amount of the Doppler shift, and searches for the optimum solution of the Doppler shift. As a result, the base station 4 can compensate for the Doppler shift included in the reception signal regardless of whether a known signal sequence is included in the reception signal.

In addition, the base station 4 according to the first embodiment obtains the maximum value of the change amount of the Doppler shift from the distance when the base station 4 and the LEO satellite are closest to each other. As a result, the base station 4 can prevent an attempt from being made for a possibility of an excessive change amount, and can improve search efficiency. If the trajectory information is known, the distance at the time of closest proximity to the LEO satellite can be calculated in advance. In this case, the base station 4 may store a distance when the base station 4 and the LEO satellite are closest to each other or a maximum value of a change amount of the Doppler shift obtained from the distance in the storage unit 43 in advance.

In addition, the base station 4 according to the first embodiment searches for the change amount of the Doppler shift by ternary search. As a result, the base station 4 can efficiently search for the change amount of the Doppler shift. On the other hand, the present invention is not limited thereto in other embodiments, and the base station 4 may search for the change amount of the Doppler shift by another search method such as sequential search. In the ternary search according to the first embodiment, the 33 percentile and 66 percentile values of the search range are set as possibilities, but the present invention is not limited thereto. For example, in other embodiments, 25 percentile and 75 percentile values of the search range may be possibilities. Furthermore, for example, in another embodiment, a golden section search of dividing the search range on the basis of the golden ratio may be performed. A golden section search is also an example of a ternary search.

Second Embodiment

The base station 4 according to the first embodiment determines the initial values of the upper possibility and the lower possibility of the change amount of the Doppler shift to the 33 percentile and the 66 percentile of the search range from zero to the maximum value. On the other hand, the base station 4 according to the second embodiment estimates the position of the mobile relay station 2 and estimates the change amount of the Doppler shift from the above Equation (1). By determining the initial values of the upper possibility and the lower possibility on the basis of the estimated value, the base station 4 can search for the change amount of the Doppler shift in a shorter time as compared with the first embodiment.

Figure 9:
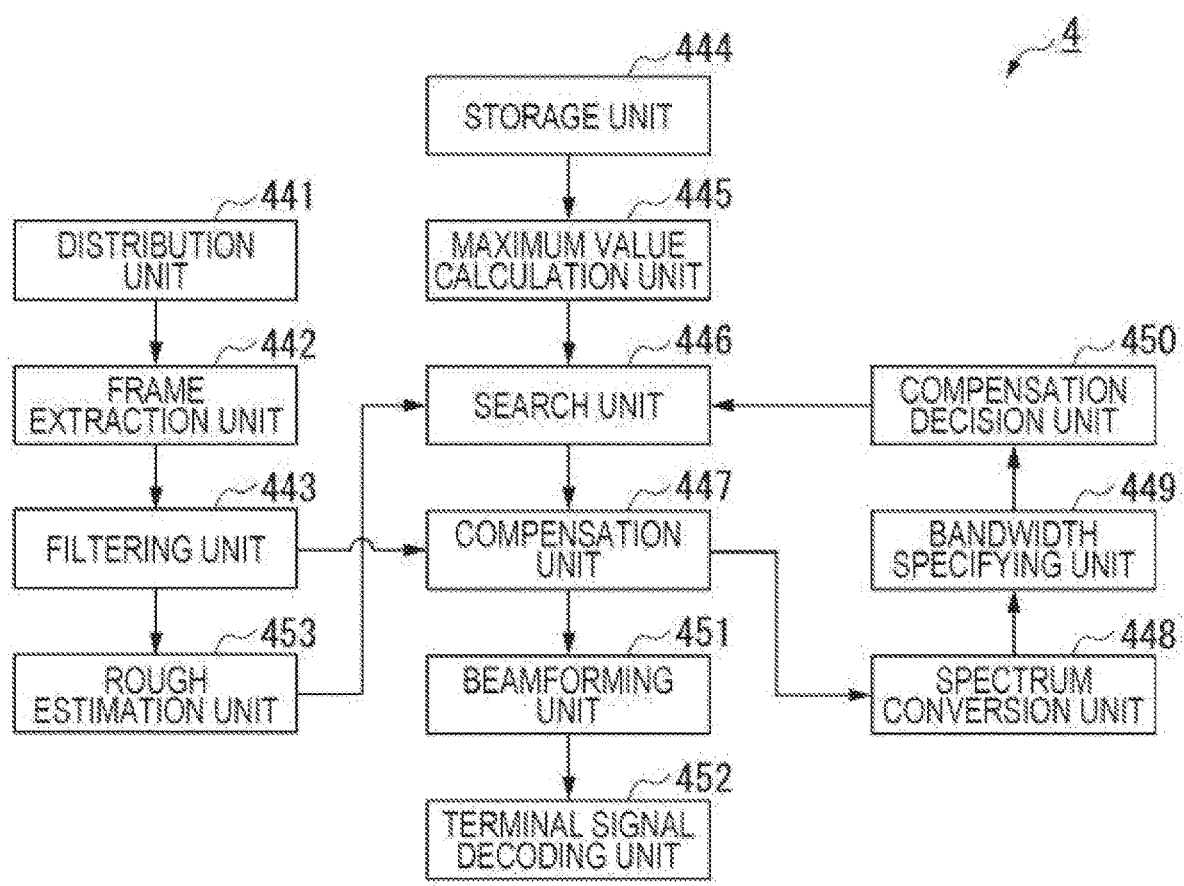
FIG. 9 is a schematic block diagram illustrating a configuration of a terminal signal reception processing unit according to a second embodiment.

FIG. 9 is a schematic block diagram illustrating a configuration of a terminal signal reception processing unit 44 according to the second embodiment. The terminal signal reception processing unit 44 according to the second embodiment further includes a rough estimation unit 453 in addition to the configuration of the first embodiment.

The rough estimation unit 453 performs synthesis while changing the phase shift amount of the reception frame filtered by the filtering unit 443 and related to the same time, thereby estimating the arrival direction of the frame by scanning the reception beams or nulls by the antennas 21-1 to 21-N. The rough estimation unit 453 estimates the position of the LEO satellite on the basis of the arrival direction of the signal and the trajectory data of the LEO satellite stored in the storage unit 444. The rough estimation unit 51 may estimate the position x of the LEO satellite on the basis of the reception time of the frame and the trajectory data of the LEO satellite stored in the storage unit 444. The rough estimation unit 453 estimates the change amount of the Doppler shift by obtaining the differential value of f(x) indicated in Equation (1).

The search unit 446 according to the second embodiment determines a search range on the basis of the change amount estimated by the rough estimation unit 453 and the estimation error of the change amount by the rough estimation unit 453. For example, the search range is determined to be a range from a value obtained by subtracting the estimation error from the estimated change amount to a value obtained by adding the estimation error to the estimated change amount. In addition, the search unit 446 suppresses the search range to a range of zero or more and the maximum value calculated by the maximum value calculation unit 445 or less. As a result, the search unit 446 can narrow the initial value of the search range.

As described above, the base station 4 according to the second embodiment can narrow the search range of the change amount of the Doppler shift by estimating the position of the LEO satellite. As a result, the base station 4 can search for the optimal solution with a small number of trials.

OTHER EMBODIMENTS

Although embodiments have been described in detail with reference to the drawings, specific configurations are not limited to the above-described configurations, and various design changes and the like can be made thereto. That is, in other embodiments, the order of the above-described processes may be changed as appropriate. Further, some processes may be executed in parallel.

In the embodiment described above, the base station 4 functions as a Doppler shift compensation device and compensates for a Doppler shift in communication between the terminal station 3 as a transmission device and the mobile relay station 2 as a reception device, but the present invention is not limited thereto. For example, in another embodiment, the mobile relay station 2 may compensate for the Doppler shift of the reception signal. In this case, the mobile relay station 2 is an example of a reception device and a Doppler shift compensation device. The reception processing unit 49 of the base station 4 may compensate for the Doppler shift in the communication between the base station 4 and the mobile relay station 2. In this case, the mobile relay station 2 is an example of a transmission device, and the base station is an example of a reception device and a Doppler shift compensation device.

In the above-described embodiment, the base station 4 and the mobile relay station 2 perform communication by MIMO, but the present invention is not limited thereto, and at least one of the base station 4 and the mobile relay station 2 may perform communication using one antenna. That is, the shift specifying unit 446 determines the direction of the convex function representing the change amount of the Doppler shift with respect to time in the reception frame so that the bandwidth of the reception frame after the compensation becomes small.

Further, in the above-described embodiment, the mobile relay station 2 converts the reception signal into a baseband signal and transmits the baseband signal to the base station 4, but the present invention is not limited thereto. For example, in another embodiment, the base station 4 may include the frequency conversion units 222-1 to 222-N, and the mobile relay station 2 may transmit the waveform data of the reception signal of the RF band to the base station 4.

Figure 10:
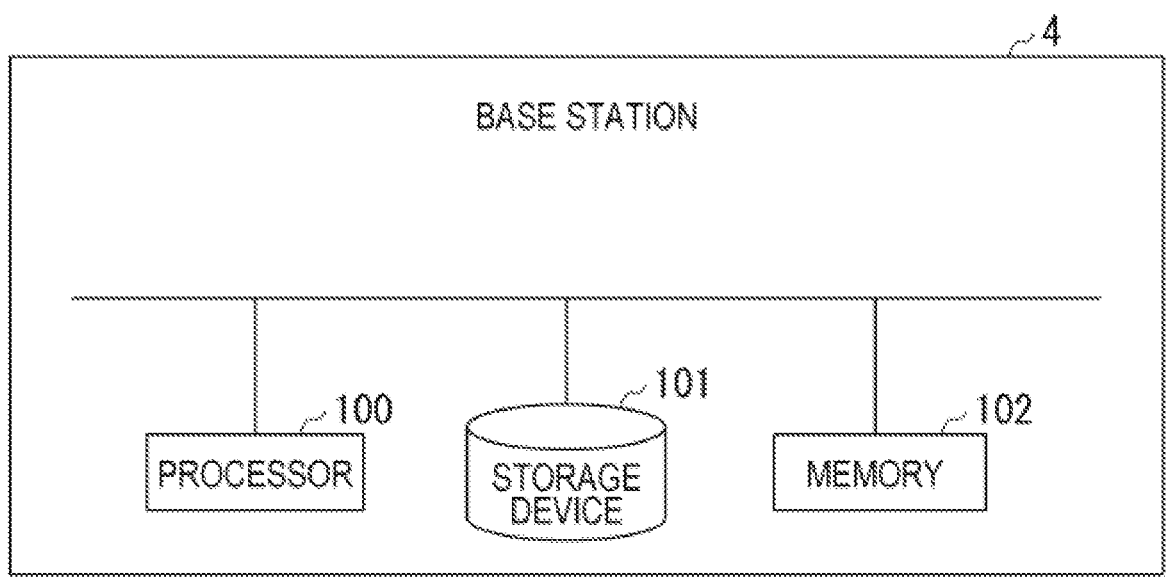
FIG. 10 is a diagram illustrating a hardware configuration example of a functional unit of a base station according to each embodiment.

FIG. 10 is a diagram illustrating a hardware configuration example of a functional unit of the base station 4 according to each embodiment. Some of the mobile relay station 2, the terminal station 3, and the base station 4 in each of the above-described embodiments may be implemented by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disk, a ROM, or a CD-ROM, or a storage device such as a hard disk included in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as a field programmable gate array (FPGA).

That is, some or all of the functional units of the wireless communication system are implemented as software by a processor 100 such as a central processing unit (CPU) executing a program stored in a memory 102 including a nonvolatile recording medium (non-transitory recording medium). The program may be recorded on a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 101 such as a hard disk built in a computer system. Some or all of the functional units of the wireless communication system may be achieved using hardware including an electronic circuit (electronic circuit or circuitry) in which, for example, a large scale integrated circuit (LSI), an application specific integrated circuit (ASIC), a programmable logic device (PLD), a field programmable gate array (FPGA), or the like is used.

REFERENCE SIGNS LIST

1 Wireless communication system
2 Mobile relay station
3 Terminal station
4 Base station
21-1 to 21-N Antenna
22 Terminal communication unit
23 Data storage unit
24 Base station communication unit
25 Antenna
31 Data storage unit
32 Transmission unit
33 Antenna
41 Antenna station
42 MIMO reception unit
43 Base station signal reception processing unit
44 Terminal signal reception processing unit
221-1 to 221-N Reception unit
222-1 to 222-N Frequency conversion unit
223-1 to 223-N Waveform recording unit
241 Storage unit
242 Control unit
243 Transmission data modulation unit
244 MIMO transmission unit
441 Distribution unit
442 Frame extraction unit
443 Filtering unit
444 Storage unit
445 Maximum value calculation unit
446 Search unit
447 Compensation unit
448 Spectrum conversion unit
449 Bandwidth specifying unit
450 Compensation decision unit
451 Beamforming unit
452 Terminal signal decoding unit
453 Rough estimation unit

The invention claimed is:

1. A Doppler shift compensation device comprising:
one or more processors configured to perform as:
a signal acquisition unit that acquires a reception signal received by a reception device from a transmission device that moves relative to the reception device;
a compensation unit that compensates for a Doppler shift of the reception signal based on a possibility of a change amount of the Doppler shift; and
a change unit that changes a value of the possibility of the change amount of the Doppler shift in a case where a bandwidth is larger than a predetermined value, the bandwidth having power equal to or greater than a predetermined threshold in frequency components of the reception signal after compensation.

2. The Doppler shift compensation device according to claim 1, wherein the one or more processors further configured to perform as a maximum value calculation unit that calculates a maximum value of the change amount of the Doppler shift based on a distance when the transmission device and the reception device are closest to each other and a relative moving speed of the transmission device and the reception device,
wherein the change unit changes the value of the possibility to a value within a range of zero to the maximum value.

3. The Doppler shift compensation device according to claim 2, wherein
the compensation unit compensates for the Doppler shift of the reception signal based on a first possibility of the change amount of the Doppler shift and compensates for the Doppler shift of the reception signal based on a second possibility of the change amount of the Doppler shift, and
the change unit changes values of the first possibility and the second possibility by ternary search based on the Doppler shift compensated based on the first possibility and the Doppler shift compensated based on the second possibility.

4. The Doppler shift compensation device according to claim 1, wherein the one or more processors further configured to perform as an estimation unit that estimates the change amount of the Doppler shift of the reception signal based on a path of the transmission device viewed from the reception device and a reception time of the reception signal,
wherein the change unit changes the value of the possibility to a value within a search range including the change amount that has been estimated.

5. A Doppler shift compensation method comprising:
acquiring a reception signal received by a reception device from a transmission device that moves relative to the reception device;
compensating for a Doppler shift of the reception signal based on a possibility of a change amount of the Doppler shift; and changing a value of the possibility of the change amount of the Doppler shift in a case where a bandwidth is larger than a predetermined value, the bandwidth having power equal to or greater than a predetermined threshold in frequency components of the reception signal after compensation.

* * * * *